United States Patent [19]
Choh et al.

[11] Patent Number: 5,870,069
[45] Date of Patent: Feb. 9, 1999

[54] METHOD FOR DISPLAYING COLOR IMAGE UNDER VARIOUS ILLUMINANTS

[75] Inventors: Heui-keun Choh, Seoul; Du-sik Park, Suwon, both of Rep. of Korea

[73] Assignee: Samsung Electronics Co., Ltd., Suwon, Rep. of Korea

[21] Appl. No.: 782,688

[22] Filed: Jan. 15, 1997

[30] Foreign Application Priority Data

Jan. 15, 1996 [KR] Rep. of Korea .................... 1996-637

[51] Int. Cl.$^6$ ............................................. G09G 1/28
[52] U.S. Cl. .......................................... 345/22; 345/150
[58] Field of Search ............................ 345/22, 150, 152, 345/153

[56] References Cited

U.S. PATENT DOCUMENTS 4,875,032  10/1989  McManus et al. ..................... 345/154
5,313,291   5/1994  Appel et al. .......................... 358/501

*Primary Examiner*—Matthew Luu
*Attorney, Agent, or Firm*—Rothwell, Figg, Ernst & Kurz

[57] ABSTRACT

A method for displaying a color image under various illuminants is provided. In the color image displaying method, the chromaticity of an illuminant existing in a space in which a predetermined display device is located and the luminance ratio of a white paper on the display under the illuminant with respect to a luminance of the display device are measured. A shift ratio of a visual white of the display device using the chromaticity and the luminance ratio is determined. A new visual white of the display device in which the influence of the illuminant is removed using the shift ratio is obtained. A white of a displayed color image on the display device is shifted to the new visual white. Therefore, a visually consistent color image can be reproduced on the color display device under any illuminant.

4 Claims, 4 Drawing Sheets

METHOD FOR DISPLAYING COLOR IMAGE UNDER VARIOUS ILLUMINANTS

BACKGROUND OF THE INVENTION

The present invention relates to a method for displaying a color image under various illuminants, and more particularly, to a method for displaying a visually consistent color image regardless of illuminants by removing the influences of chromaticity and luminance of the respective illuminants.

A device-independent color processing method which is a conventional color image reproducing method is based on a device characterization method for setting up the relationship between a standard color signal and a device color signal of the color input and output device. When using this method, a colorimetric color matching can be achieved between an input image and a displayed image, however, the influences exerted due to the changes in the chromaticity and the brightness of the illuminant cannot be avoided since they are not considered at all.

There is a conventional method for compensating for the above problems by applying the color processing technology using a visual color model. In this method, the chromaticity and the brightness of the display device and a printer illuminant are considered. However, the method can be applied under an independent observation condition in which an observation condition of the color image on the display device is not affected by the observation condition of a color printer output material at all. In particular, the observation condition of this method is restricted to the case in which it is dark, namely, it is not affected by the chromaticity or the brightness of the illuminant. Therefore, this method has limitations for applications in a general office environment in which the color image on the display device is observed under an office illuminant. In particular, the above problems of the conventional technologies become bigger as the difference in the chromaticity between a monitor and the illuminant increases. This is because the change in the chromatic adaptation state of an observer is not reflected during observation of the image on the display device and a constant level of light of the illuminant reflected from the surface of the display device is not considered at all.

SUMMARY OF THE INVENTION

It is an object of the present invention to provide a method for displaying a color image under various illuminants, and more particularly, to a method for displaying a visually consistent color image regardless of illuminants by removing the influences of chromaticity and luminance of the respective illuminants.

To achieve the above object, there is provided a method for displaying a color image under the respective illuminants according to the present invention, comprising the steps of: detecting the chromaticity of an illuminant existing in a space in which a predetermined display device is located and the luminance ratio of a white paper on the display under the illuminant with respect to the luminance of the display device; determining a shift ratio of a visual white of the display device using the chromaticity and the luminance ratio; obtaining a new visual white of the display device in which the influence of the illuminant is removed using the shift ratio; and shifting a white of a displayed color image on the display device to the new visual white.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Hereinafter, a preferred embodiment of the present invention will be described in detail with reference to the attached drawings.

The chromaticity and luminance of an illuminant are used as information regarding the illuminant of a space in which a display device is located. In order to measure the chromaticity and luminance ratio of a white paper on the display under the illuminant with respect to the white of the display device, methods for measuring them visually and using a device are used. In the method for measuring them by a device, the chromaticity and the luminance of an illuminant are measured at the same time using a radiometer.

Figure 1:
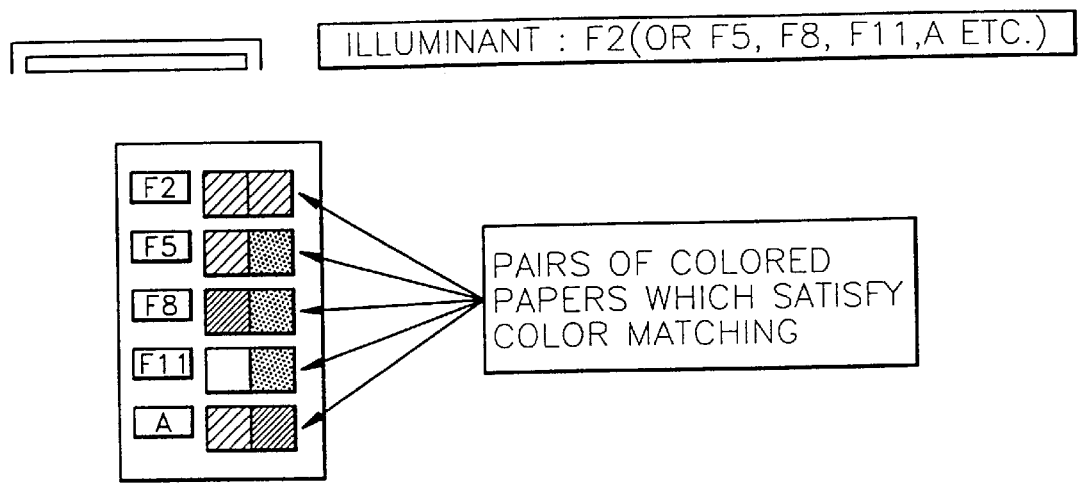
FIG. 1 is a view describing a method for determining a chromaticity of an illuminant using color matching.

In the method for measuring them visually, a method for detecting the chromaticity of a specific illuminant using several pairs of colored papers which satisfy color matchings conditions under different illuminants of which chromaticities are already known can be used. Referring to FIG. 1, the illuminant is restricted to an tungsten lamp (A) and fluorescent lamps (F2, F5, F8 and F11) and the chromaticity of the illuminant is detected using the colored papers having different spectral characteristics which satisfy color matching under the respective light sources. For example, in the case of restricting the illuminants to the above five, the colored papers are arranged in five pairs of colored papers which satisfy the color matching with respect to the respective light sources in order to determine the chromaticity. Only one pair of colored papers is sensed to be the same color by an observer since it satisfies the color matching under a specific illuminant and the remaining four pairs are sensed to be different in color, thus it is possible to determine the illuminant.

Figure 2:
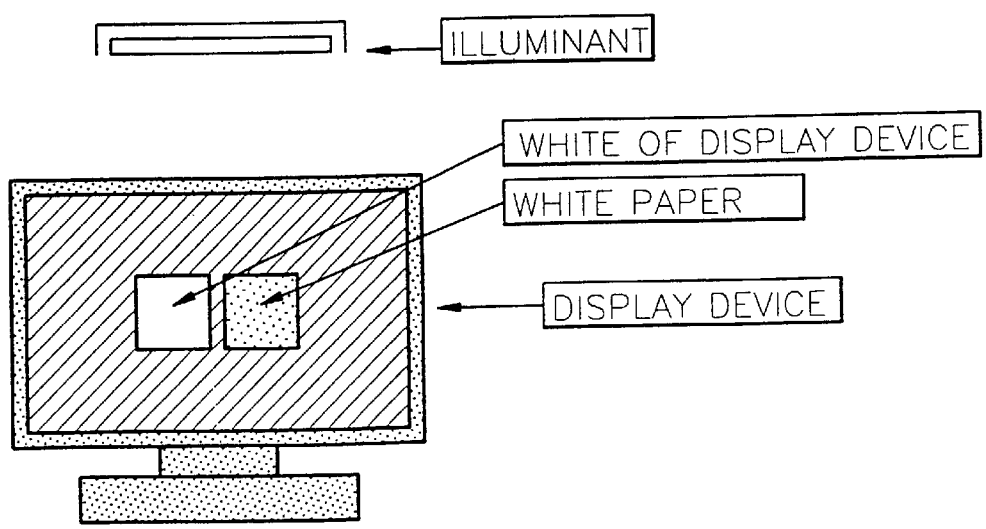
FIG. 2 is a view showing an arrangement of a white of a display device and a white paper for comparing brightness.

A method of visual estimation of the ratio of the brightness of a white image to that of a white paper, displayed side by side on a display, is used for visually measuring the luminance ratio of the white paper on the display with respect to the white of the display. Referring to FIG. 2, the observer expresses the brightness ratio of the white image of the display device and the white paper by numbers. The luminance ratio can be calculated using a CIE LAB by the brightness ratio indicated by the numbers. For example, when the white brightness of the display device is sensed to be twice as bright as the white paper, the white brightness of the entire image can be described as the luminance of the image of the brighter part, considering the two parallel white images as one image. That is, the white brightness of the display device becomes the white brightness of the entire image. Therefore, according to the definition of CIE LAB, the lightness value $L^*_{dis}$ of the white of the display device becomes 100. Also, since the white of the display device is sensed to be twice as bright, the lightness value $L^*_{wp}$ of the white paper is 50. The $L^*_{wp}$ can be expressed by the following Equation (1) when it is expressed by the luminance ratio.

$$L^*_{wp}=116[(Y_{wp}/Y_{dis})^{1/3}]-16=50 \tag{1}$$

Therefore, the luminance ratio $Y_{wp}/Y_{dis}$ of the white paper with respect to the display device can be expressed by the following Equation (2).

$$Y_{wp}/Y_{dis}=[(50+16)/116]3 \tag{2}$$

That is, the luminance ratio ($Y_{wp}/Y_{dis}$) is calculated as $[(100/r+16)/116]^3$ when the white of the display device is determined to be r times ($r \geq 1.0$) as bright as the white paper and, the luminance ratio ($Y_{wp}/Y_{dis}$) is calculated as $[(100/r'+16)/116]^{-3}$ when the white of the display device is determined to be r' times ($r' \geq 1.0$) dimmer than the white paper.

The chromaticity of the illuminant and the luminance ratio of a white paper on the display under the illuminant with respect to the white of display device can be detected by the above method.

The influence of the illumination on the color displayed by the display device is a function of the change in the chromatic adaptation state of the observer. The change of the chromatic adaptation state is expressed by the shift of the white brightness of the display device in a visual aspect. The change of the visual white brightness of the display device is measured by measuring the influences of the chromaticity and the luminance of the illuminant and the chromaticity and the luminance of the display device. The chromaticity and the luminance of the display device are respectively fixed as 9300° K and 60 cd/m². A chromatic adaptation stimulus for providing a uniform chromatic adaptation state to the observer is the image of a square of 12.5° and is composed of many random dots of about 2×2 mm² size of which values of lightness (L*) and of chromaticities (a* and b*) are given arbitrarily. The entire luminance thereof is set to 12.0 cd/m² which is 0.2 times the white like a neutral gray. Display regions other than the chromatic adaptation stimulus are maintained black. The chromatic adaptation state of the observer, namely, a test stimulus for looking for the visual white which is a color region of a 2° size is located in the middle of the chromatic adaptation stimulus. A test stimulus which is initially provided to the observer is designed as a random color. In order to avoid a color of an excessively high saturation, the a* and b* values of CIE LAB are restricted to the values between −10 and +10 and the luminance is fixed as 12.0 cd/m². Also, it is designed to be displayed for 200 msec and taken off for 1800 msec, thus flickering in a period of 2 sec. At this time, the observer controls the stimulus as being gray. In order to facilitate the control, the color is designed to be controlled on a and b* planes. A fluorescent lamp such as F2, F5 and F8 is used as the illuminant. The chromaticities and color temperatures of them are shown in table 1 with the chromaticity (u', v') and the color temperature of the display device.

TABLE 1

|  | u' | v' | color temperature(°K.) |
|---|---|---|---|
| F2 | 0.2203 | 0.4996 | 4230 |
| F8 | 0.2092 | 0.4881 | 5000 |
| F5 | 0.1927 | 0.4769 | 6350 |
| D65 | 0.1980 | 0.4680 | 6500 |
| display device | 0.1848 | 0.4388 | 9300 |

In the present invention, the degree of the change of the visual white of the display device is described by the shift ratio. A method for calculating the shift ratio is described as follows with reference to FIG. 3 when the illuminant is F2.

Figure 3:
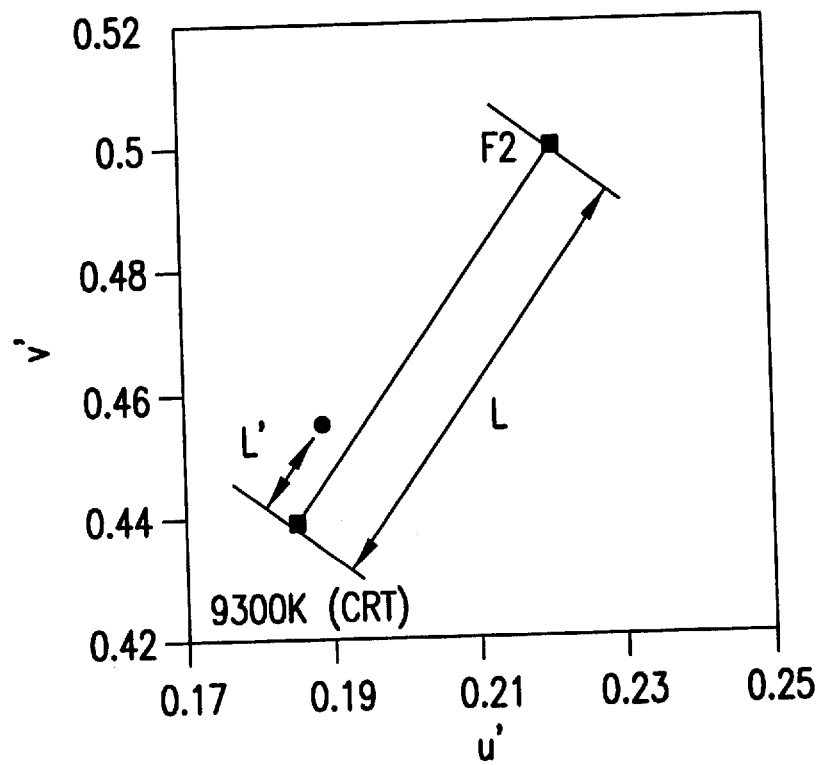
FIG. 3 is a graph for describing a method for calculating a shift ratio of a white point.

In FIG. 3, the shift ratio is obtained by calculating a ratio of the length L', distance between visual white point and white point of the display, to the length L, distance between white point of the display and the chromaticity of the illuminant. Namely, the shift ratio is defined as L'/L. Such calculations are all performed in a uniform color space, i.e., a u'-v'plane. In case the visual white point deviates from a straight line which connects the chromaticity points of the display and of the illuminant, the distance between the visual white point and a point on a line passing through the white point of the display perpendicular to the straight line at a distance from the visual white point equal to the amount of deviation is calculated as the length L' as shown in FIG. 3 as an example.

When the illuminant is F2, the change in the white point of the display device according to the change in the luminance of the illuminant is described as follows with reference to FIG. 4.

Figure 4:
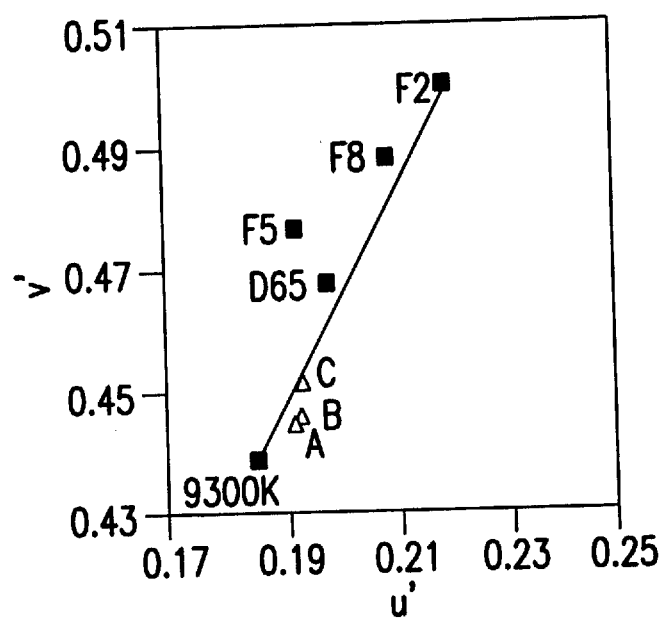
FIG. 4 is a graph showing a shift of the white point of a display device in case the illuminant is F2.

In FIG. 4, when the luminance of a white paper on the display under the illuminant F2 is 33 cd/m², the visual white of the display device shifts about 12.1% in the chromaticity direction of F2 from 9300° K (which is the original white of the display device) to point A. When the luminance of the white paper is 61 cd/m², the visual white of the display device shifts about 14.5% in the chromaticity direction of F2 from 9300° K to point B. When the luminance of the white paper is 95 cd/m², the visual white of the display device shifts about 21.5% in the chromaticity direction of F2 from 9300° K to point C. Even though the luminance increases, the visual white of the display device tends to be located between the chromaticity point of the illuminant and the white chromaticity point of the display device.

Figure 5:
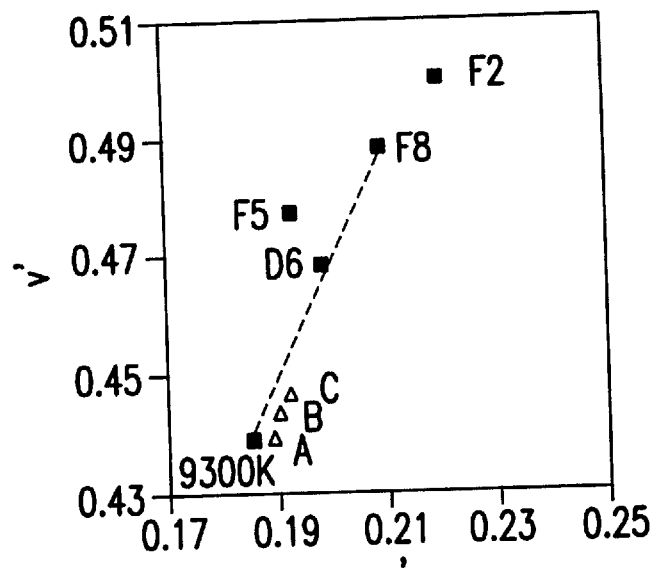
FIG. 5 is a graph showing the shift of the white point of the display device in case the illuminant is F8.
Figure 6:
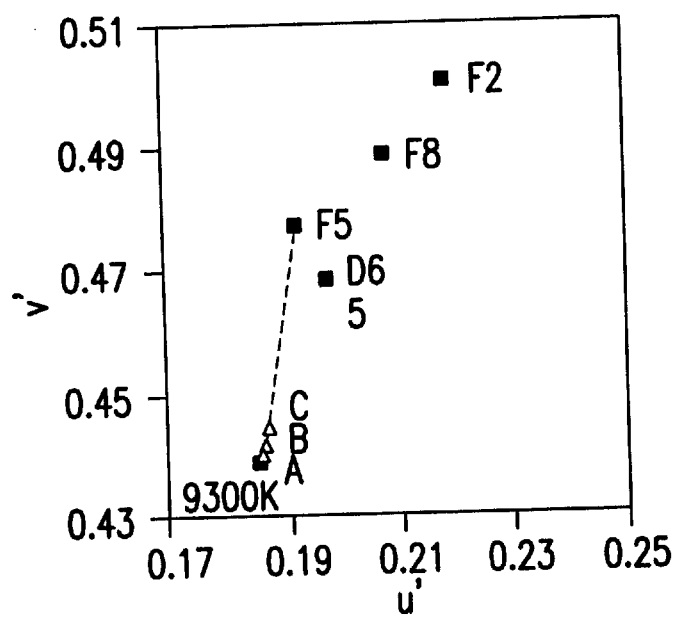
FIG. 6 is a graph showing the shift of the white point of the display device in case the illuminant is F5.

The changes in the whites of the display device according to the changes in the luminances are described with reference to FIGS. 5 and 6 when the illuminants are F8 and F5.

Figure 7:
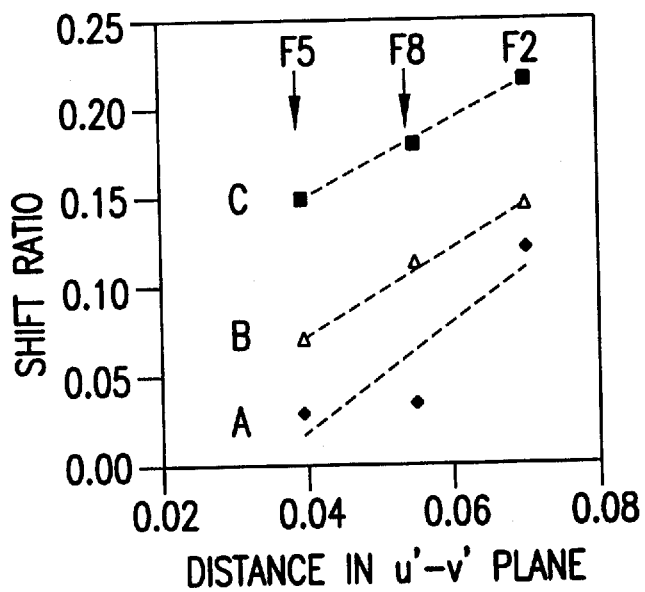
FIG. 7 is a graph showing a shift ratio of a visual white according to increases in the luminances of the illuminants F2, F8 and F5.

FIG. 7 shows the change in the visual white of the display device as a function of the luminance of respective illuminants. It is noted that the shift ratio increases according to the increase in the luminance. The relation between the distances between the respective chromaticity points and the shift ratios with respect to the luminances of the three stages shown in FIG. 7 is expressed as a slope and an intercept which satisfy a best fit using a linear equation with respect to the distance as shown in the following Table 2. The shift ratio (SR) by the illuminant can be expressed by a linear equation with respect to D by the following Equation (3) when the distance between the chromaticity of the illuminant and the chromaticity of the display device is D.

$$SR=A*D+B \tag{3}$$

It is noted from Table 2 that the slope A and the intercept B become functions with respect to the luminance of the illuminant in the above Equation (3), which is shown in FIG.

8. At this time, the luminance dependence of the coefficients are expressed by the luminance ratio (Yr) of the white of the illuminant and the display device.

TABLE 2

| luminance(cd/m$^2$) | slope (A) | intercept (B) |
|---|---|---|
| A: ~ 30 | 2.108 | 0.0649 |
| B: ~ 60 | 2.351 | -0.0194 |
| C: ~ 90 | 2.859 | -0.0945 |

Figure 8:
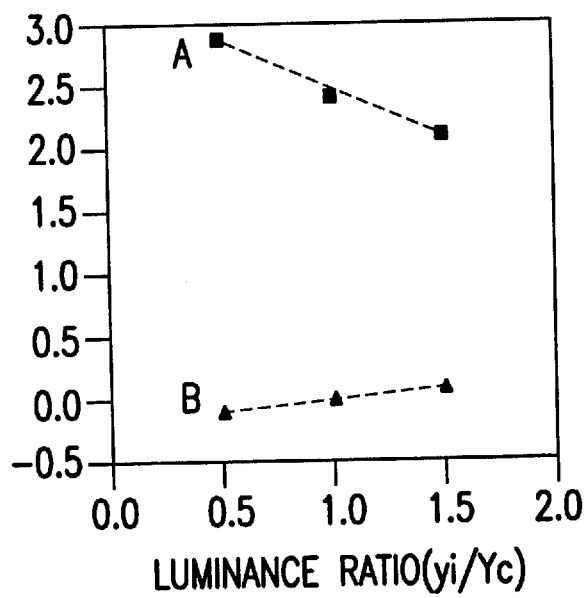
FIG. 8 is a graph showing the dependence of a luminance ratio of coefficients A and B in a formula of the shift ratio according to the distance between chromaticity points.

Since the dependence according to the luminance ratio of the coefficients A and B shown in FIG. 8 also shows a linear relationship, it can be expressed by the linear Equations (4) and (5).

$$A = -0.751*(Yr) + 3.190 \quad (4)$$

$$B = -0.159*(Yr) + 0.176 \quad (5)$$

Therefore, the shift ratio (SR) of the visual white of the display device by the illuminant which is the function of the distance D between the chromaticity of the illuminant and the chromaticity of the display device and the luminance ratio Yr of the illuminant and the display device can be expressed by the following formula (6).

$$SR = [-0.751*(Yr) + 3.190]*D + [-0.159*(Yr) + 0.176] \quad (6)$$

The shift ratio of the visual white of the display device by an illuminant having optional chromaticity and luminance can be calculated when the chromaticity and luminance of the display device are known. When the luminance of the display device is almost identical to the luminance of the illuminant, the above Equation (6) can be simplified to the following Equation (7) since Yr=1.0.

$$SR = 2.439*D + 0.017 \quad (7)$$

When the change of the white of the display device by the illuminant is reflected to the real display device, the shift ratio defined as mentioned above determines the degree of shift from the straight line which connects the chromaticity of the illuminant and the chromaticity of the display device. Therefore, a calculated point between the two whites may deviate from a daylight locus in coordinates. Since the u'-v' coordinates, uniform color coordinates used in the present invention have a daylight locus which is closer to the straight line than that of the x-y coordinates, there are few instances in which the shifted chromaticity point deviates far from the daylight locus. However, when using the x-y coordinates or using the chromaticity point closer to the daylight locus, the chromaticity point on the daylight locus located within the closest distance from the shifted chromaticity should be used. The following Equation (8) describing the daylight locus in the u'-v' coordinates can be used in order to find the chromaticity point on the daylight locus located within the closest distance from a calculated chromaticity point in the u'-v'coordinates.

$$v' = -36.317u'^2 + 16.687u' - 1.4114 \quad (8)$$

There are various methods for finding the chromaticity on the daylight locus located within the distance closest from an optional chromaticity point such as a simplex algorithm.

It is possible to detect by the above-mention method the chromaticity of the illuminant and the luminance ratio of a white paper on the display under the illuminant with respect to the luminance of the display device which affect the color displayed, thus it is possible to calculate the shift ratio of the visual white of the display device. A new visual white of a display device in which the influence of the illuminant is removed can be calculated using the calculated shift ratio. The influence of the illuminant can be removed by shifting the white of the image displayed to a new white using the new visual white of the display device calculated as above. At this time, it is possible to convert the white of the displayed image into a new visual white by writing a new lookup table using a new visual white of the display device or by performing a white conversion in a standard color space.

In a method for displaying a color image under various illuminants according to the present invention, a visually consistent color image can be reproduced on the color display device under any illuminants and expensive calorimetric equipment is not required since the chromaticity ratio and the luminance ratio of the illuminant are visually measured.

What is claimed is:

1. A method for displaying a color image under various illuminants, comprising the steps of:

detecting the chromaticity of an illuminant illuminating a particular display device and measuring the luminance ratio of the luminance of a white paper on the display under the illuminant with respect to a luminance of the display device;

determining a shift ratio of a visual white point of the display device in a chromaticity coordinate plane using said chromaticity and said luminance ratio;

obtaining a new visual white point of the display device in which the influence of the illuminant is removed using said shift ratio; and shifting a white point of a displayed color image on the display device to said new visual white.

2. A method for displaying a color image under various illuminants as claimed in claim 1, wherein said luminance ratio can be obtained by a brightness ratio of a white paper on the display device with respect to the brightness of the display device.

3. A method for displaying a color image under various illuminants as claimed in claim 2, wherein said chromaticity of the illuminant is visually measured using a discriminating tool, composed of pairs of colored papers having color matching with respect to the various illuminants.

4. A method for displaying a color image under various illuminants as claimed in claim 2, wherein, when the distance between a white point of the display device and a white point of the illuminant in u'-v' coordinates is D and a luminance ratio of the white point of the display device and the white point of the illuminant is Yr, a shift ratio (SR) from the white point of the display device to the white point of the illuminant is determined by the following equation:

$$SR = (-0.751*(Yr) + 3.190)*D + (-0.159*(Yr) + 0.176).$$

* * * * *

UNITED STATES PATENT AND TRADEMARK OFFICE
CERTIFICATE OF CORRECTION

PATENT NO.   : 5,870,069
DATED        : February 9, 1999
INVENTOR(S)  : Heui-keun Choh; Du-sik Park It is certified that error appears in the above-indentified patent and that said Letters Patent is hereby corrected as shown below:

Column 3, line 32, "illumination" should be -- illuminant --.

Column 5, line 62, "above-mention" should be -- above-mentioned --.

Signed and Sealed this

Twenty-third Day of November, 1999

Attest:

Q. TODD DICKINSON

*Attesting Officer*    *Acting Commissioner of Patents and Trademarks*